United States Patent
Li et al.

(10) Patent No.: US 9,159,348 B2
(45) Date of Patent: Oct. 13, 2015

(54) SYSTEMS AND METHODS FOR CLEARANCE MONITORING IN STORAGE MEDIA

(71) Applicant: HGST Netherlands B.V., Amsterdam (NL)

(72) Inventors: Jianhua Li, Kanagawa (JP); Junguo Xu, Ibaraki (JP); Toshiya Shiramatsu, Kanagawa (JP); Takehiro Sato, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 23 days.

(21) Appl. No.: 14/109,603

(22) Filed: Dec. 17, 2013

(65) Prior Publication Data

US 2015/0170695 A1      Jun. 18, 2015

(51) Int. Cl.
*G11B 21/02*   (2006.01)
*G11B 5/60*    (2006.01)

(52) U.S. Cl.
CPC .................................. *G11B 5/6017* (2013.01)

(58) Field of Classification Search
None
See application file for complete search history.

(56) References Cited

U.S. PATENT DOCUMENTS

| | | | |
|---|---|---|---|
| 6,191,901 B1 | 2/2001 | Carlson et al. | |
| 7,477,470 B2 * | 1/2009 | Leis et al. | 360/75 |
| 7,800,858 B1 * | 9/2010 | Bajikar et al. | 360/75 |
| 8,098,450 B2 * | 1/2012 | Baumgart et al. | 360/75 |
| 8,254,051 B2 | 8/2012 | Kuramoto | |
| 8,279,550 B1 * | 10/2012 | Hogg | 360/75 |
| 8,482,872 B1 * | 7/2013 | Contreras et al. | 360/31 |
| 8,854,764 B2 * | 10/2014 | Chiu et al. | 360/75 |
| 8,941,941 B1 * | 1/2015 | Hogg et al. | 360/75 |
| 2005/0094303 A1 | 5/2005 | Chan | |
| 2010/0128399 A1 | 5/2010 | Che et al. | |
| 2011/0157736 A1 | 6/2011 | Contreras et al. | |
| 2012/0099218 A1 | 4/2012 | Kurita et al. | |
| 2012/0120521 A1 | 5/2012 | Kurita et al. | |
| 2013/0044387 A1 | 2/2013 | Marchon et al. | |
| 2013/0077189 A1 | 3/2013 | Kato et al. | |
| 2013/0094104 A1 | 4/2013 | Ngan et al. | |
| 2013/0170068 A1 | 7/2013 | Natori | |

FOREIGN PATENT DOCUMENTS

JP      2008-077751       4/2008

OTHER PUBLICATIONS

"Adjusting Fly-Height of MR Heads Based on Temperature and Pressure", IBM Technical Disclosure Bulletin, May 2, 2002, United States, accessed from http://ip.com/IPCOM/000015673.

"File Flyheight Monitor With No Added Hardware", IBM Technical Disclosure Bulletin, Apr. 1, 1990, United States, accessed from http://ip.com/IPCOM/000100493.

* cited by examiner

*Primary Examiner* — K. Wong

(57) ABSTRACT

A method for measuring the head-disk clearance between a slider and a disk includes measuring a first resistance with a first bias applied to an embedded contact sensor of the slider, measuring a second resistance with a second bias applied to the embedded contact sensor of the slider, and determining the head-disk clearance based at least in part on a difference between the first resistance and the second resistance. A system includes a disk drive, a slider comprising an embedded contact sensor, and circuitry to apply at least two bias voltages to the embedded contact sensor, measure at least two resistances of the embedded contact sensor based on the application of the at least two bias voltages, and to determine the head-disk clearance based at least in part on a difference between the at least two resistances.

20 Claims, 4 Drawing Sheets

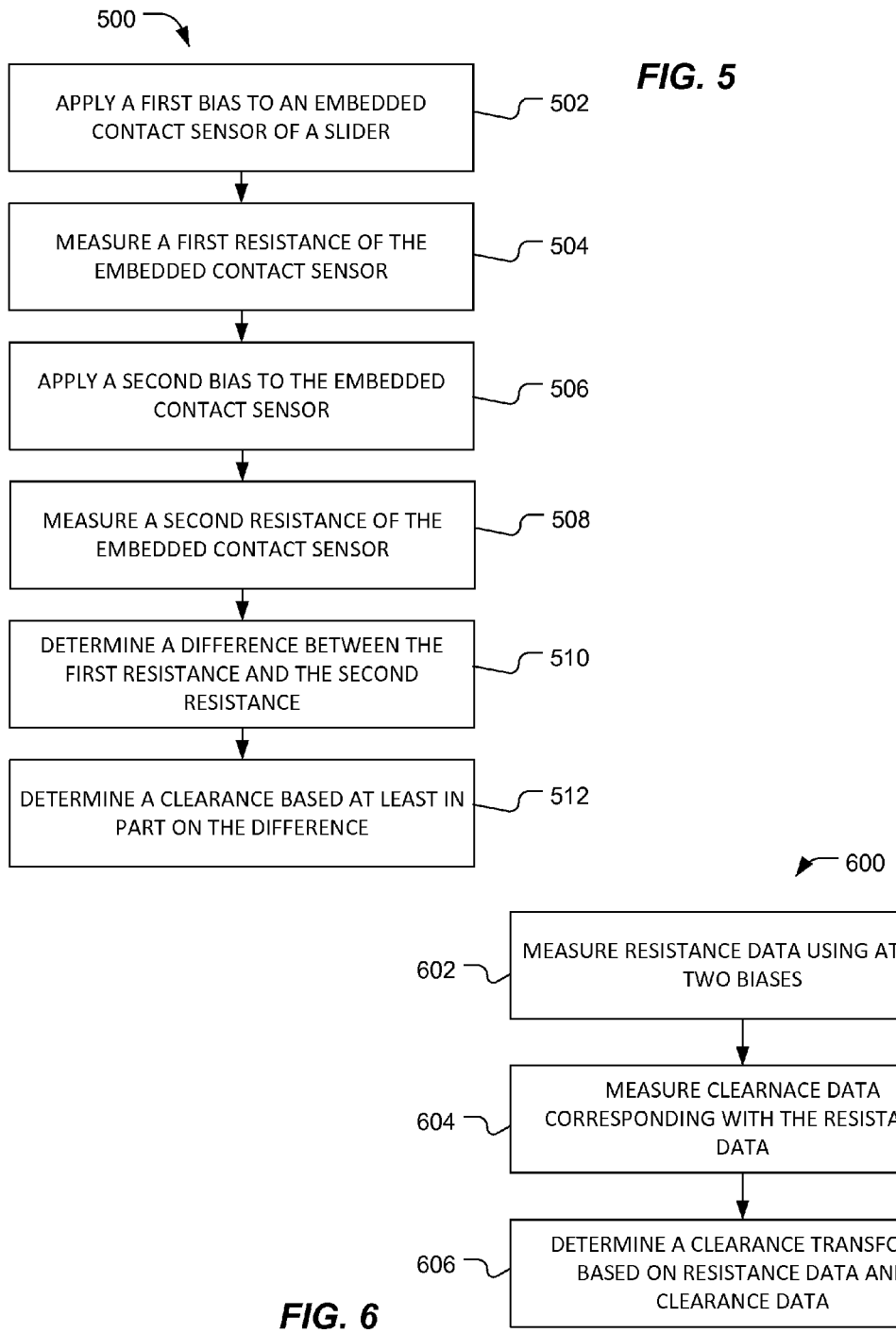

SYSTEMS AND METHODS FOR CLEARANCE MONITORING IN STORAGE MEDIA

FIELD OF THE DISCLOSURE

This disclosure, in general, relates to systems and methods for clearance or fly-height monitoring in storage media.

BACKGROUND

As time progresses, there is an ever-increasing demand for data storage. As businesses increasingly turn to paper free environments and computer intensive business practices, there is increased usage of electronic storage. With consumers showing an increased interest in digital photography, digital music and movies, and other digital entertainment, there is increased demand for electronic storage. Moreover, with the advent of cloud-based computing and remote storage, both businesses and consumers are turning to large-scale storage systems that provide remote access to data.

With the increasing demand for electronic storage, there is a corresponding increase in demand for higher density magnetic storage devices, such as hard disk drives. Hard disk drives conventionally include read/write transducers that reside within a slider. The slider flies over a recording medium or disk. Lower clearance between the read/write transducers and the recording media permits higher storage density recording media.

However, if the slider contacts the storage media, such contact can cause damage within storage media or to the slider. Further, the surface of the recording media or the amount of lubricant over the storage media can fluctuate with position along the surface of the storage media. Such fluctuations can lead to changes in the parameters associated with accurate data storage or can poorly influence the slider, leading to damage.

BRIEF DESCRIPTION OF THE DRAWINGS

The present disclosure may be better understood, and its numerous features and advantages made apparent to those skilled in the art by referencing the accompanying drawings.

FIG. 5 and FIG. 6 include block flow diagrams illustrating exemplary methods for monitoring clearance.

The use of the same reference symbols in different drawings indicates similar or identical items.

DETAILED DESCRIPTION

Read and write elements or transducers reside in the slider of a hard disk drive (HDD). As flying height diminishes, it becomes more relevant to accurately control the head-disk distance (i.e., the distance between the read-write heads and the disk). Two items that can negatively affect the fly-height or clearance of the slider are lubricant-slider interaction, such as lube pickup, and electrostatic force. The negative effects of both of these items can be diminished or eliminated by controlling the slider's voltage potential with respect to the disks potential. Therefore, controlling the slider's voltage reduces slider wear and allows for lower flying-heights. This voltage-controlled slider can also be a component of other architecture features such as: fly-height modulation, active damping, pre-contact detection, fly-height measurement and control, disk defect mapping, and high-frequency detection for additional spacing feedback information.

Also, with low fly-heights, in the nanometers, disk waviness and disk lubricant moguls are factors that alter the topography of the surface of a disk enough to significantly alter a slider's fly-height above a disk surface, even within a single revolution of a disk. Other factors, such as temperature and altitude at which a disk drive operates, can also alter the flying height of a slider in a significant manner. For example if a hard disk drive is operated at a high temperature or high altitude or both, flying height of the slider may decrease unless there is active control. As such, the fly-height or clearance monitoring or fly-height control using resistances of an embedded contact, as described herein, is useful for constantly monitoring and controlling fly-height that is not sensitive to read-write performance, head magnetic performance, or charge differences between the slider head and the disk surface.

In particular, clearance or fly-height, used interchangeably herein, is correlated with temperature at the tip of the slider. Changes in fly-height cause changes in temperature of the slider which cause changes in a resistance of sensors, such as an embedded contact sensor. In an exemplary embodiment, the resistance across an embedded contact sensor is measured for two different biases. The difference in resistances associated with the two distinct biases also correlates with the clearance. As such, a difference in resistance of the embedded contact sensor in response to the application of distinct biases can be applied to a clearance transfer to provide an indication of clearance. Such an indication of clearance can be used for feedback or feed forward thermal fly-height control.

Example Hard Disk Drive

Figure 1:
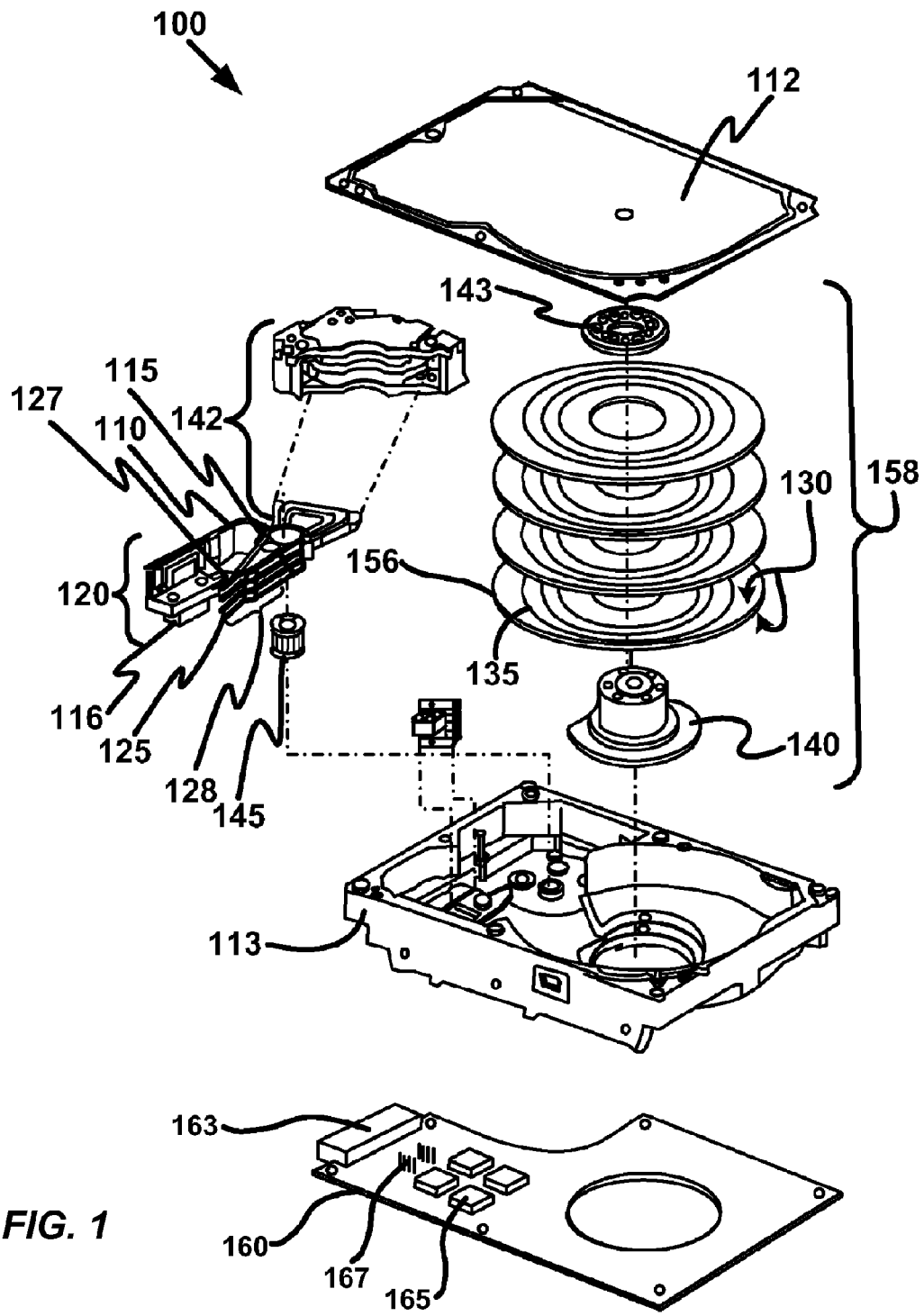
FIG. 1 includes an illustration of an exemplary hard disk drive.

In an exemplary embodiment illustrated in FIG. 1, an isometric blow-up view of an example hard disk drive (HDD) 100 is presented. A base casting 113 provides coupling points for components and sub-assemblies such as a disk stack 158, a voice coil motor (VCM) 142, and a head stack assembly (HSA) 120. The disk stack 158 is coupled with the base casting 113 by means of a motor-hub assembly 140 and a disk clamp 143. The motor-hub assembly 140 can have at least one disk 156 coupled with it such that the disk 156 can rotate about an axis common to the motor-hub assembly 140 and the center of disk 156. The disk 156 has at least one disk surface 130 upon which reside data tracks 135. The HSA 120, at times referred to as an actuator assembly or carriage, comprises a suspension 127, which suspends a hard disk drive slider 125 next to a disk surface 130, and an HSA connector 116. In one embodiment, the suspension 127 is an integrated lead suspension (ILS). The hard disk drive slider 125 includes one or more magnetic transducers or heads which read data from and write data to data tracks 135. The suspension 127 and the hard disk drive slider 125 comprise the head gimbal assembly (HGA) 128. A flex cable 110, which is part of the HSA 120, conveys data between the HSA connector 116 and an arm electronics (AE) module 115. The AE module 115 controls read and write operations and, as described herein, in various embodiments includes a read-write integrated circuit (IC) (not shown). The read-write IC is coupled to slider 125 via a flex cable 110 and the suspension 127. In some embodiments, the read-write IC is located elsewhere within the HDD 100, such as on the flex cable 110, within other portions of the HSA 120, or on a printed circuit board (PCB) 160. The HSA connector 116 also conveys control data between the PCB 160 and the VCM 142.

The HSA 120 is coupled pivotally with the base casting 113 by means of a pivot bearing 145, such that the VCM 142 can move the HGA 128 with the slider 125 accurately across the disk surface 130, accessing data tracks 135. Upon assembly of the HSA 120, the disk stack 158, the VCM 142, and other components with the base casting 113, a cover 112 is coupled with the base casting 113 to enclose these components and sub-assemblies into the HDD 100.

The cover 112 is coupled with the base casting 113, and the PCB 160 is coupled to the base casting 113. The PCB 160 comprises electrical components 165 which in general perform the electrical signal processing for the HDD 100, such as status checks for the HDD 100, power control for the motor-hub assembly 140, servo control of the VCM 142, and other tasks related to reading data from and writing data to the disk media. The VCM 142 is electrically coupled with the PCB 160 via the HSA connector 116 and an appropriately mating connection 167 on the PCB 160. Electrical coupling of the HDD 100 to a host system in which the HDD 100 operates is enabled in part through the PCB connector 163, coupled to the PCB 160. The PCB 160 or electrical components 165 can be configured in other physical manners and other locations, in other embodiments.

The displayed configuration of the HDD 100 is shown by way of example and not of limitation. In embodiments, one or more components of the HDD 100 can be interchanged or shared between subassemblies while maintaining the scope of the definitions of the aforementioned assemblies and sub-assemblies.

Figure 2:
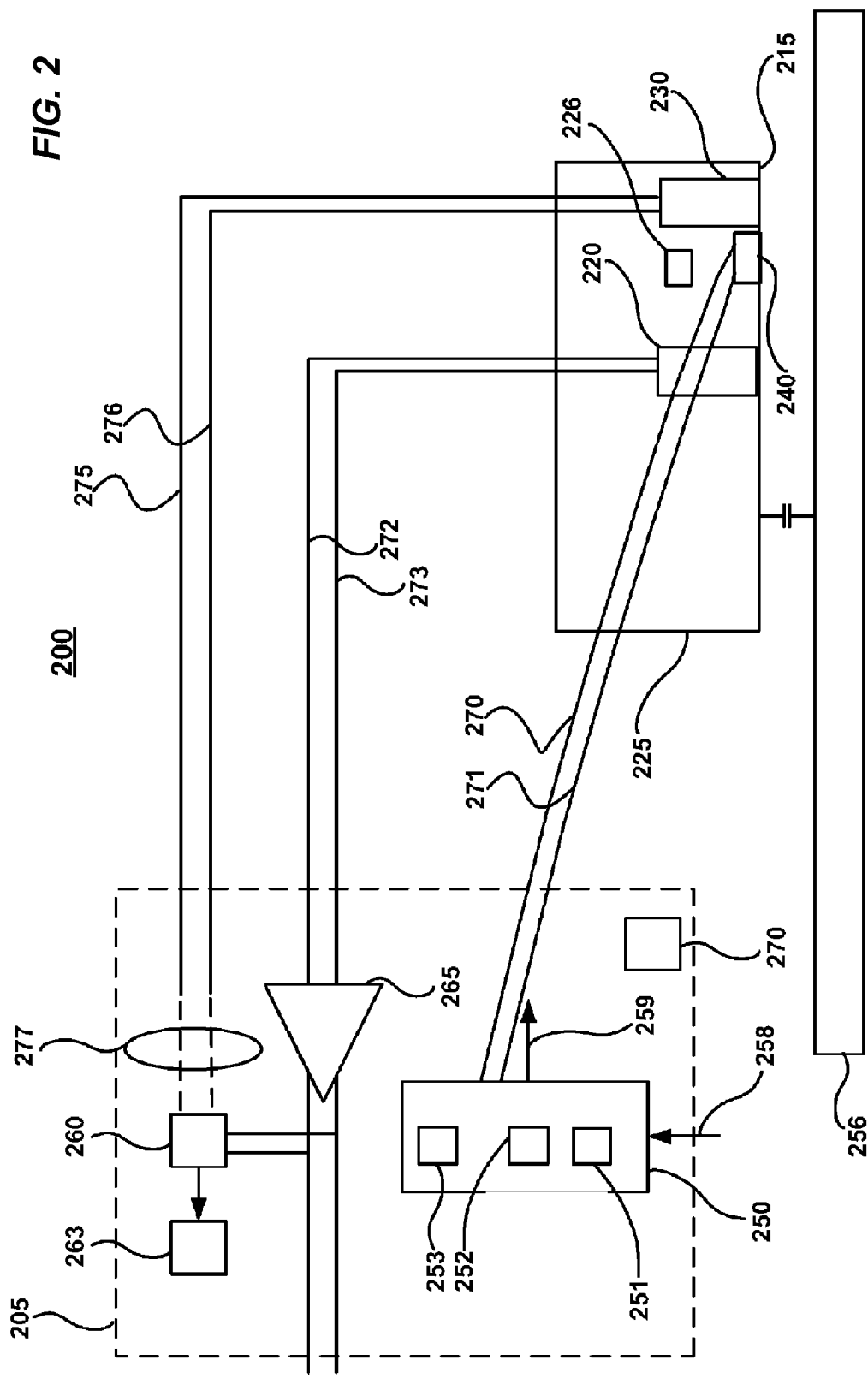
FIG. 2 includes an illustration of an exemplary slider and control mechanism.

Example Integrated System for Slider Bias Potential Control, Touch-Down Detection and Fly-Height Determination in a HDD FIG. 2 illustrates an integrated HDD slider bias potential control, touch-down detection and fly-height determination system 200 ("system 200"). In various embodiments one or more components of the system 200 can be disposed in a HDD, such as the HDD 100. For purposes of example, and not of limitation, the system 200 is described herein as if it is disposed within a HDD. The system 200, in one embodiment, includes a slider 225 and read/write IC 205, which interact with a disk 256. In some embodiments, an existing signal path(s) is utilized for conveyance of signals between read/write IC 205 and slider 225.

The slider 225 includes writer 230 configured to write data to the disk 256, a reader 220 configured to read data from the disk 256, a fly-height controller, such as a thermal fly-height controller (TFC) 226 configured to adjust slider fly-height (as described above) and an embedded contact sensor 240. In an example, the embedded contact sensor can be a resistive temperature detector (RTD) to sense the temperature near an air-bearing surface (ABS) 215. In one embodiment, the reader 220 is a tunneling magnetoresistive (TMR) element.

The embedded contact sensor 240 can be located proximate the ABS 215 and the writer 230. The embedded contact sensor 240 can be configured to facilitate detecting a slider's proximity to the disk 256 (e.g., media). In particular, embedded contact sensor 240 can facilitate detecting when the slider 225 changes fly-height or head/disk clearance or comes into physical contact with disk 256. For example, when the slider 225 comes into physical contact with the disk 256, heat generated from the friction between the slider 225 and the disk 256 increases the resistance of an RTD embedded contact sensor 240. Changes in fly-height can change the temperature of an RTD embedded contact sensor 240. Additionally, changes in temperature can be altered by air-cooling effects which can then be accounted for by a rate in change in the temperature changes in the RTD embedded contact sensor 240. Accordingly, a voltage or a current across an RTD embedded contact sensor 240 changes. In an embodiment, real-time write-element contact is measured via the embedded contact sensor 240. In various embodiments, the embedded contact sensor 240 is a thermal stripe or foil (e.g., metallic or semiconductor) on the slider 225.

The read/write IC 205, arm electronics, or the hard drive controller includes one or more portions of a clearance monitoring system 250. The clearance monitoring system 250 includes biasing for the embedded contact sensor 240. The clearance monitoring system 250 further includes clearance monitor or contact detector 251, bias controller 252, and resistance monitor 253. In one embodiment, an input 258 to the clearance monitoring system 250 is a touch-down (TD) or temperature reference level input (e.g., reference voltage). In another embodiment, an output 259 from the clearance monitoring system 250 includes an indication of a TD event or an indication of clearance or fly-height.

The clearance monitor 251 is configured to detect real-time slider fly-height or clearance or media-disk contact based on differences in resistance resulting from different biases applied to an embedded contact sensor 240. In an example, the bias controller 252 applies a bias (voltage or current) across nodes 270 and 271. The resistance monitor 253 detects a change in resistance of embedded contact sensor 240, either by a change in voltage or a change in current across the embedded contact sensor 240.

Figure 4:
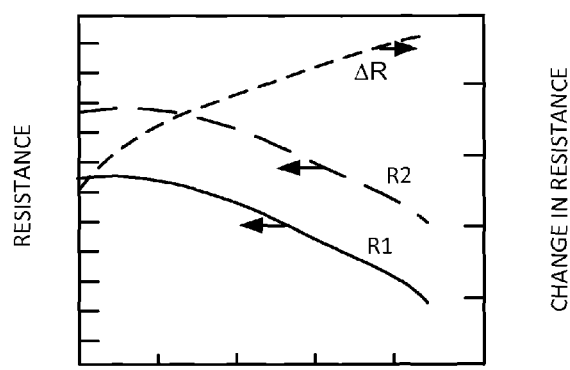
FIG. 4 includes a graph illustrating the relationship of resistance and clearance.

As friction caused by media-disk contact heats the embedded contact sensor 240, a voltage or current across the embedded contact sensor 240 changes. The voltage or current is also dependent on the bias voltage applied to the embedded contact sensor 240. For a given clearance or fly-height, the resistance of the embedded contact sensor 240 changes with bias voltage. The difference in resistance based on different biases applied to the embedded contact sensor changes with clearance or fly-height, as illustrated in FIG. 4 (described in more detail below). Clearance or fly-height is measured based on the value of the difference in resistance.

Optionally, a slider signal controller (not illustrated) is configured to control bias potential of the slider 225 with respect to voltage potential of the disk 256. By setting the slider body potential at the contact potential with respect to the disk 256, lubrication on disk 256 may not build up on the slider 225. Optionally, the slider bias potential can be controlled via the embedded contact sensor 240. In an example, the embedded contact sensor 240 can be driven in a common mode on nodes 270 and 271 (e.g., direct current (DC)). For example, a slider bias in a common mode is added to the differential mode across nodes 270 and 271.

In particular, the bias controller 252 applies different biases, such as DC biases, across nodes 270 and 271. Optionally, these different biases can be centered on the voltage potential of the disk 256. Alternatively, the biases are selected for sensitivity relative to clearance. The resistance monitor 253 is configured to detect the resistance of the embedded contact sensor 240 in response to the different biases applied to the embedded contact sensor 240 by the bias controller 252.

In particular, clearance is correlated with a different in resistance when at least two biases are applied across an embedded contact sensor. The embedded contact sensor resides in the slider head. Other circuitry for facilitating measurement of clearance using resistances across the embedded contact sensor can reside in one or more other components of the hard drive system, such as the arm electronics including read/write controls or a hard disk controller.

Figure 3:
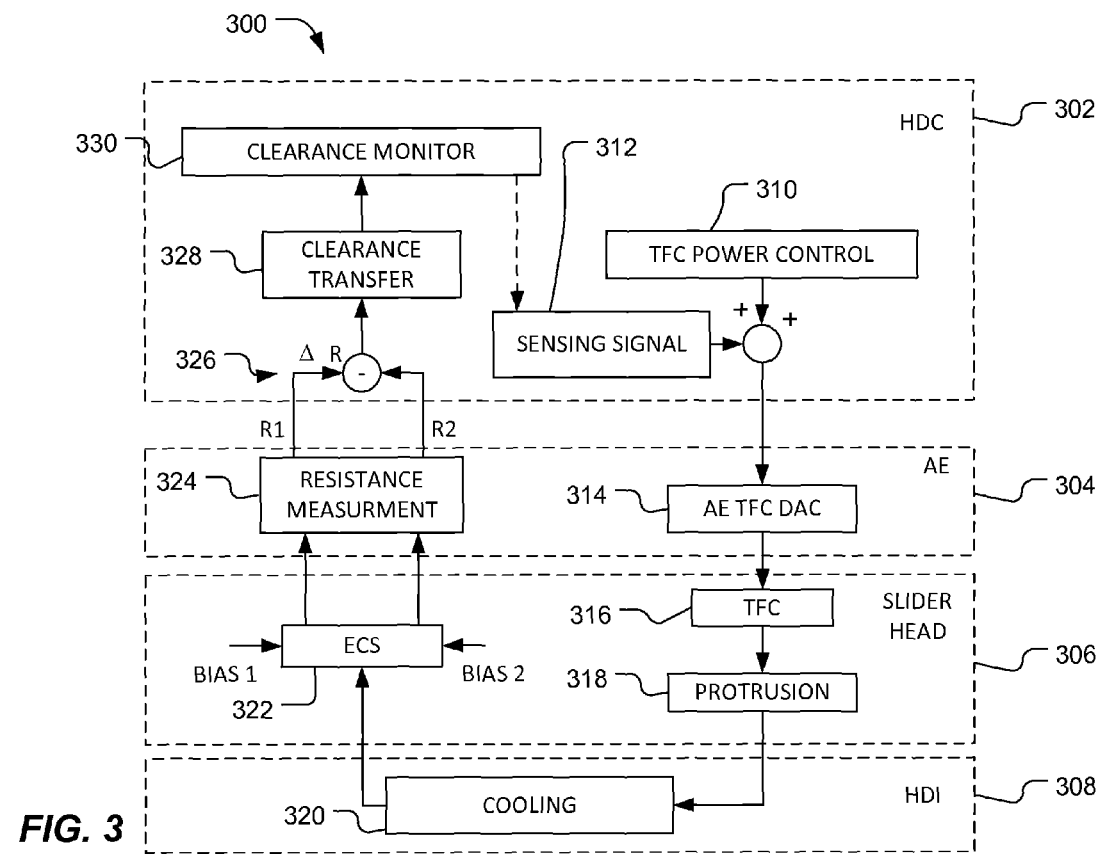
FIG. 3 includes an illustration of an exemplary monitoring system.

In particular, FIG. 3 illustrates an exemplary system 300 to facilitate clearance monitoring. In an example, a hard drive controller 302 includes a thermal fly-height control (TFC) power controller 310 that provides a signal to a thermal fly-height control (TFC) digital-to-analog controller (DAC) 314 disposed in arm electronics 304. The signal provided from the TFC power controller 310 can be augmented with a sensing signal 312.

In response to receiving a signal from the TFC DAC 314, the thermal fly-height controller 316 on the slider head 306 controls a protrusion 318, varying the clearance between the tip of the slider head 306 and the hard disk recording medium. In particular, the thermal fly-height controller 316 can heat, causing thermal expansion of the slider head 306 near the tip which facilitates the protrusion 318. Activation of the thermal fly-height controller 316 can be controlled in conjunction with the write signals to maintain the write coil within a desired fly-height relative to the hard disk drive.

As the tip of the slider head 306 flies over the hard disk recording medium, the distance between the protrusion 318 and hard disk drive facilitates an air bearing surface (ABS) or hard disk interface 308. Dissipation of heat generated by the thermal fly-height controller 316 or a write coil is influenced by the clearance at the hard disk interface 308. As such, the amount of cooling 320 is at least partially related to the clearance or fly-height of the slider head 306 relative to the hard disk.

Such cooling 312 influences the temperature of an embedded contact sensor 322. The temperature influences the resistance of the embedded contact sensor 322. As such, the resistance of the embedded contact sensor correlates with clearance. For example, as illustrated in FIG. 4, resistance of the embedded contact sensor 322 when a first bias is applied varies with clearance. Similarly, a second resistance associated with the embedded contact sensor when a second bias is applied also varies with clearance. In addition, the difference in resistance between when a first bias is applied relative to when a second bias is applied varies with clearance. In particular, such a resistance difference between resistances when two distinct biases are applied exhibits greater sensitivity relative to clearance.

Returning to FIG. 3, resistance measurement 324 can measure the resistance across the embedded contact sensor 322 when different biases are applied. As illustrated in FIG. 3, at least two biases are applied. For example, at least two biases can be applied, such as at least three biases, or even at least for biases. As illustrated, the resistance measurement 324 resides on arm electronics 304. However, the resistance measurement 324 can reside on a slider head 306 or other control circuitry, such as hard drive controller 302. The measured resistances are fed to a subtractor 326 to generate a resistance differences between the different measured resistances. Such resistance differences are fed to a clearance transfer 328, which provides an indicator of clearance to a clearance monitor 330. While the subtractor 326, clearance transfer 328, and clearance monitor 330 are depicted as residing at the hard drive controller 302, such circuitry can reside on other components of the system, such as the arm electronics 304.

Clearance transfer 328 can be determined or generated from data collected that associates resistances at different biases with the clearance. As such, a correlation relating a resistance difference to clearance, such as the correlation illustrated in FIG. 4, can be utilized to create a clearance transfer 328 that receives as input a difference in resistance and provides as output an indication of clearance.

The clearance monitor 330 can map clearance heights to determine fluctuations in a disk surface, for example for defect mapping, or to locate moguls or other accumulation of lubricant. In another example, clearance monitor 330 can in part utilize the clearance to assess or evaluate performance of the recording medium. In particular, the clearance monitor 330 can provide a signal indicative of clearance to be used in a feedback or feedforward control of the thermal fly-height control. For example, the clearance monitor 330 may provide a signal to the sensing signal block 312 that augments a signal generated by the TFC power control 310 and applied to the TFC DAC 314 on the arm electronics 304.

As such, clearance can be monitored by determining a difference in resistance between the resistances generated when at least two biases are applied to the embedded contact sensor. For example, a method 500 illustrated in FIG. 5 includes applying a first bias to an embedded contact sensor of a slider, as illustrated at 502. A first resistance of the embedded contact sensor is measured based on the application of the first bias voltage, as illustrated at 504. A second bias can be applied to the embedded contact sensor, as illustrated at 506, and, as illustrated at 508, a second resistance of the embedded contact sensor can be measured. In particular, the first and second biases are DC biases. Alternatively, an AC biases can be applied. A difference between the first and second resistances can be determined, as illustrated at 510. In particular, the measured resistances can be applied to subtractor circuit.

Using the measured difference, a clearance can be determined, as illustrated at 512. For example, the difference in resistance can be applied to a clearance transfer, which provides an indication of clearance. While FIG. 5 describes the measurement of two different resistances using two different bias voltages, third or fourth resistances can also be measured based on third or fourth bias voltages. An array of differences can be generated between each of the measured resistances and the array can be applied to the clearance transfer to generate an indication of clearance.

The bias voltages can be applied consecutively and the resistances measured consecutively. Alternatively, the embedded contact sensor can include more than one resistance path, such as more than one temperature sensitive trace. As such, different biases can be applied to each trace, and the resistances measured simultaneously.

To determine the clearance transfer, resistance and clearance data are collected and a correlation between the clearance and different resistances is determined. For example, as illustrated at FIG. 6, a method 600 includes measuring resistance data using at least two bias voltages, as illustrated at 602. In particular, resistance data can be measured for two bias voltages. In another example, resistance data can be measured for three bias voltages, or even four bias voltages. Concurrently, clearance data is measured that corresponds with the resistance data, as illustrated at 604.

As illustrated at 606, a clearance transfer is determined based at least in part on the resistance data and the clearance data. In the case of two bias voltages, the clearance transfer represented, for example by a table or function, implements a transform, such as that illustrated in the graph of FIG. 4. In another example, when three bias voltages are used, or even four bias voltages are used, more complex transforms can be used including lookup tables, functions, neural networks, or other artificial intelligence.

Accordingly, at least two DC biases can be applied across an embedded contact sensor to generate at least two resistances. At least one difference between the at least two resistances is applied to a clearance transfer to generate a signal indicative of clearance or fly-height. Such a signal can be monitored to map defects or can be used for feedback or feedforward control of a signal supplied to a thermal fly-height controller.

In a first aspect, a method for measuring the head-disk clearance between a slider and a disk includes measuring a first resistance with a first bias applied to an embedded contact sensor of the slider, measuring a second resistance with a second bias applied to the embedded contact sensor of the slider, and determining the head-disk clearance based at least in part on a difference between the first resistance and the second resistance.

In an example of the first aspect, the first and second biases are DC biases. In another example of the first aspect and the above examples, the method further includes controlling the head-disk clearance using a fly-height controller. For example, the method further includes providing a signal indicative of the head-disk clearance to the fly-height controller. In an additional example, the fly-height controller includes a thermal fly-height controller. For example, the fly-height controller is disposed in the slider.

In a further example of the first aspect and the above examples, the method further includes measuring a third resistance with a third bias applied to the embedded contact sensor of the slider, wherein determining the head-disk clearance is further based at least in part on a difference between the third resistance and the first resistance.

In an additional example of the first aspect and the above examples, determining the head-disk clearance includes applying the difference between the first and second resistances to a clearance transfer to provide the head-disk clearance.

In another example of the first aspect and the above examples, the method further includes generating a clearance transfer based on resistance measurements and head-disk clearance measurements, the clearance transfer to provide the head-disk clearance when the difference in first and second resistances is applied.

In a further example of the first aspect and the above examples, the method further includes writing data to a disk using a write coil disposed in the slider.

In an additional example of the first aspect and the above examples, the method further includes reading data from a disk using a read head disposed in the slider.

In a second aspect, a system includes a disk drive, a slider disposed to have a head-disk clearance relative to the disk drive, the slider comprising an embedded contact sensor, and circuitry to apply at least two bias voltages to the embedded contact sensor, measure at least two resistances of the embedded contact sensor based on the application of the at least two bias voltages, and to determine the head-disk clearance based at least in part on a difference between the at least two resistances.

In an example of the second aspect, the system further includes a controller to control the head-disk clearance, wherein the circuitry is to provide a signal indicative of the determined head-disk clearance to augment a control signal generated by the controller. For example, the controller is a thermal fly-height power controller in communication with a thermal fly-height controller. In an example, the thermal fly-height controller is disposed in the slider.

In another example of the second aspect and the above examples, the circuitry is to apply first and second biases to the embedded contact sensor, measure first and second resistances of the embedded contact sensor, and determine the head-disk clearance based at least in part on a difference between the first and second resistances.

In a further example of the second aspect and the above examples, the circuitry is to apply first, second and third bias voltages to the embedded contact sensor, measure first, second and third resistances of the embedded contact sensor, and determine the head-disk clearance based at least in part on a difference between the first and second resistances and based at least in part on a difference between the first and third resistances.

In an additional example of the second aspect and the above examples, the circuitry includes a clearance transfer block to provide the head-disk clearance in response to a signal based on the difference between the at least two resistances.

In another example of the second aspect and the above examples, a portion of the circuitry to measure the at least two resistances is disposed in the arm electronics.

In a further example of the second aspect and the above examples, the embedded contact sensor is a resistive thermal detector.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for measuring the head-disk clearance between a slider and a disk, the method comprising:
   with a first bias voltage applied to an embedded contact sensor of the slider, collecting data correlating the resistances of the embedded contact sensor of the slider to the head-disk clearance;
   with a second bias voltage applied to the embedded contact sensor of the slider, collecting data correlating the resistances of the embedded contact sensor of the slider to the head-disk clearance;
   calculating the differences between resistances of the embedded contact sensor with the first and second bias voltages applied;
   measuring a first resistance with the first bias applied to the embedded contact sensor of the slider;
   measuring a second resistance with the second bias applied to the embedded contact sensor of the slider; and
   determining the head-disk clearance based at least in part on using the calculated differences between the resistances of the embedded contact sensor with the first and second bias voltages applied.

2. The method of claim 1, wherein the first and second biases are DC biases.

3. The method of claim 1, further comprising controlling the head-disk clearance using a fly-height controller.

4. The method of claim 3, further comprising providing a signal indicative of the head-disk clearance to the fly-height controller.

5. The method of claim 3, wherein the fly-height controller includes a thermal fly-height controller.

6. The method of claim 3, wherein the fly-height controller is disposed in the slider.

7. The method of claim 1, further comprising:
   with a third bias voltage applied to the embedded contact sensor of the slider, collecting data correlating the resistances of the embedded contact sensor of the slider to the head-disk clearance;
   calculating the differences between resistances of the embedded contact sensor with the first and third bias voltages applied;
   measuring a third resistance with the third bias applied to the embedded contact sensor of the slider;
   wherein determining the head-disk clearance is further based at least in part on using the calculated differences between the resistances of the embedded contact sensor with the first and third bias voltages applied.

8. The method of claim 1, wherein determining the head-disk clearance includes applying the difference between the first and second resistances to a clearance transfer to provide the head-disk clearance.

9. The method of claim 1, further comprising generating a clearance transfer based on resistance measurements and head-disk clearance measurements, the clearance transfer to provide the head-disk clearance when the difference in first and second resistances is applied.

10. The method of claim 1, further including writing data to a disk using a write coil disposed in the slider.

11. The method of claim 1, further including reading data from a disk using a read head disposed in the slider.

12. A system comprising:
   a disk drive;
   a slider disposed to have a head-disk clearance relative to the disk drive, the slider comprising an embedded contact sensor; and circuitry to
      apply at least two bias voltages to the embedded contact sensor;
      with a first bias voltage applied to the embedded contact sensor, collect data correlating the resistances of the embedded contact sensor to the head-disk clearance;
      with at least one additional bias voltage applied to the embedded contact sensor, for each bias voltage collect data correlating the resistances of the embedded contact sensor to the head-disk clearance;
      calculate the differences between resistances of the embedded contact sensor with the first and each of the additional bias voltages applied;
      measure at least two resistances of the embedded contact sensor based on the application of the at least two bias voltages; and
      determine the head-disk clearance based at least in part on a difference between the at least two resistances.

13. The system of claim 12, further comprising a controller to control the head-disk clearance, wherein the circuitry is to provide a signal indicative of the determined head-disk clearance to augment a control signal generated by the controller.

14. The system of claim 13, wherein the controller is a thermal fly-height power controller in communication with a thermal fly-height controller.

15. The system of claim 14, wherein the thermal fly-height controller is disposed in the slider.

16. The system of claim 12, wherein the circuitry is to apply first and second biases to the embedded contact sensor, measure first and second resistances of the embedded contact sensor, and determine the head-disk clearance based at least in part on a difference between the first and second resistances.

17. The system of claim 12, wherein the circuitry is to apply first, second and third biases to the embedded contact sensor, measure first, second and third resistances of the embedded contact sensor, and determine the head-disk clearance based at least in part on a difference between the first and second resistances and based at least in part on a difference between the first and third resistances.

18. The system of claim 12, wherein the circuitry includes a clearance transfer block to provide the head-disk clearance in response to a signal based on the difference between the at least two resistances.

19. The system of claim 12, wherein a portion of the circuitry to measure the at least two resistances is disposed in the arm electronics.

20. The system of claim 12, wherein the embedded contact sensor is a resistive thermal detector.

* * * * *